(12) United States Patent
Ueshima et al.

(10) Patent No.: US 8,307,382 B2
(45) Date of Patent: Nov. 6, 2012

(54) OPTICAL DISC APPARATUS INCLUDING A DISC TRAY

(75) Inventors: Rikiya Ueshima, Osaka (JP); Ryuuji Hayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 242 days.

(21) Appl. No.: 12/776,791

(22) Filed: May 10, 2010

(65) Prior Publication Data
US 2010/0287573 A1  Nov. 11, 2010

(30) Foreign Application Priority Data

May 11, 2009 (JP) ................. 2009-114439

(51) Int. Cl.
*G11B 17/04* (2006.01)
(52) U.S. Cl. ...................................... 720/613
(58) Field of Classification Search .......... 720/613, 720/610, 611
See application file for complete search history.

(56) References Cited

U.S. PATENT DOCUMENTS

| | | | |
|---|---|---|---|
| 6,910,218 B2 * | 6/2005 | Park et al. | 720/653 |
| 7,103,893 B2 * | 9/2006 | Kimura et al. | 720/613 |
| 7,131,127 B2 * | 10/2006 | Nasu | 720/613 |
| 7,234,152 B2 * | 6/2007 | Sakagami | 720/613 |
| 7,367,034 B2 * | 4/2008 | Hara | 720/613 |
| 7,430,748 B2 * | 9/2008 | Wu | 720/611 |
| 7,757,243 B2 * | 7/2010 | Yim et al. | 720/613 |
| 2005/0289566 A1 * | 12/2005 | Lo | 720/600 |
| 2007/0006242 A1 * | 1/2007 | Hara | 720/613 |
| 2007/0079311 A1 * | 4/2007 | Kimura et al. | 720/613 |
| 2007/0180457 A1 * | 8/2007 | Makino | 720/613 |

FOREIGN PATENT DOCUMENTS
JP   2007-200507   8/2007

* cited by examiner

*Primary Examiner* — Brian Miller
(74) *Attorney, Agent, or Firm* — Morgan, Lewis & Bockius LLP (57) ABSTRACT

An optical disc apparatus includes: a disc tray 2; a main chassis 1 including an opening 130 in a front wall 13, the disc tray 2 being moved in and out of the main chassis through the opening 130; a plurality of support portions 151, 151*f* supporting lower surfaces of guide rails 22 of the disc tray 2; a plurality of pressing portions 16(17) for suppressing floating of the guide rails 22, wherein the plurality of the support portions 151, 151*f* is arranged so that the front side is inclined upwards with respect to the rear side when the disc tray 2 is accommodated in the main chassis 1.

11 Claims, 8 Drawing Sheets

OPTICAL DISC APPARATUS INCLUDING A DISC TRAY

This application is based on Japanese Patent Application No. 2009-114439 filed on May 11, 2009, and the contents of which are hereby incorporated by reference.

BACKGROUND OF THE INVENTION

1. Field of the Invention

The present invention relates to an optical disc apparatus provided with a disc tray to load in and to carry out an optical disc medium that is a recording medium.

2. Description of Related Art

Recently, an optical disc apparatus has been widely used, in which light is irradiated onto a recording surface of an optical disc medium to perform recording of information or reproducing of information. The optical disc apparatus includes a chassis utilized as a housing, and a disc tray provided for the chassis so as to be moved in or out of an opening formed in front of the chassis.

When the disc tray protrudes most outside of the chassis from the opening, the disc tray is located at a disc loading position where the optical disc medium is loaded on or off. The optical disc medium is placed on the disc tray, and the disc tray is moved into the inside of the chassis so as to load the optical disc medium inside of the chassis. When recording/reproducing of information is completed, the optical disc medium is returned on the disk tray. The disc tray on which the optical disc medium is placed is moved outside so as to carry the optical disc medium out of the chassis.

Each of the sides of the disc tray includes a rail extending in sliding direction. The chassis includes support portions for supporting a lower surface of the rail and pressing portions for pressing an upper surface of the rail. The disc tray is slid while the rails are supported by the support portions. The upper surface of the rail is pressed by the pressing portions so that the disc tray is suppressed from floating. Spaces are typically formed between the pressing portions and the upper surface of the rail for reducing friction while the disc tray is slid.

Hereinafter, the disc tray will be explained. When the disc tray protrudes most outside of the chassis from the opening, the gravity point of the disc tray is outside of the chassis. At this time, a protruding end part of the disc tray inclines downwards, and the upper surface of the rail is in contact with the pressing portions. This inclination is due to the weight of the disc tray itself and the weight of the optical disc medium if the optical disc medium is placed.

It is confirmed that when the disc tray is moved into the chassis and the gravity point passes the opening, the disc tray is abruptly returned from an inclined state to its former angle by the movement of the gravity point. Such abrupt change of an attitude of the disc tray is a cause to decrease remarkably the quality of the optical disc apparatus.

Accordingly, a disc apparatus described in JP-A-2007-200507 includes a guide rib and an inclination absorbing rib both of which are in contacted with the upper surface of the guide rail formed on the tray so as to suppress the abrupt change in the attitude. Each of the guide rib and the inclination absorbing rib is formed by an inclined surface having a lower surface formed to be gradually lowered in the inserting direction of the tray. When the tray is moved from outside into inside of, a rear end of the guide rail is smoothly guided by the inclined surface, and therefore the abrupt change of the attitude of the tray is suppressed.

The abrupt inclination of the disc tray when moving can be suppressed by the disc apparatus disclosed in JP-A-2007-200507. However, it is difficult to suppress downward inclination of the protruding end of the disc tray when the disc tray protrudes outside of the chassis.

Furthermore, in the disc tray, positions of the gravity points of the disc tray are different from each other among the case where the optical disc medium is not placed, a case where the optical disc medium with a diameter of 12 cm is placed, and a case where the optical disc medium with a diameter of 8 cm is placed. If the positions of the gravity points of the disc tray are different from each case, positions where the abrupt inclination of the disc tray occurs are different. If using the inclination absorbing rib disclosed in JP-A-2007-200507, it might be difficult to suppress the abrupt inclination of the disc tray when a different sized optical disc medium is placed, or when an optical disc medium is not placed.

SUMMARY OF THE INVENTION

It is an object of the present invention to provide an optical disc apparatus in which a disc tray is used to load in and carry out an optical disc medium, and which can suppress an inclination of the disc tray when protruding outside, and suppress also abrupt change of an attitude of the disc tray when being moved.

An optical disc apparatus according to one aspect of the present invention includes: a disc tray on which an optical disc medium is placed; a main chassis formed in a box shape including an opened upper part, and the main chassis including an opening in a front wall, the disc tray being moved in and out of the main chassis through the opening; a plurality of support portions formed on the main chassis to support lower surfaces of guide rails formed along sides of the disc tray; and a plurality of pressing portions formed on the main chassis to suppress floating of the guide rails. And when the disc tray is moved into the inside of the main chassis, the plurality of the pressing portions is arranged so that the front side of the disc tray is inclined upwards with respect to the rear side.

According to this structure, when a force due to the weight of the disc tray itself acts on a part of the disc tray which protrudes, the amount of the downward inclination of the front side of the disc tray can be reduced since the plurality of the support portions are formed so that the front support portion is higher.

When the disc tray is moved in and out of the main chassis, the inclination of the disc tray can be suppressed from being changed largely. Consequently, the abrupt change in the attitude of the tray by the own weight can be reduced, and the movement of the disc tray can be made smooth.

In a preferable embodiment of the present invention, one of the pressing portions is a long pressing portion which is formed longer, in the sliding direction, than other pressing portion, and a lower surface of the long pressing portion includes an inclination part which is formed on the front side of the lower surface and inclines downwards toward the rear side, and a parallel part formed to be connected with the rear side of the inclination part and to be parallel with a surface connecting upper parts of the support portions.

The rear end of the guide rail is guided by the inclination part, a distance between a lower surface of the guide rail and the support portion becomes gradually shorter, and the end is contacted with the parallel part. While the parallel part and an upper surface of the guide rail are contacted with each other, the disc tray inclines and the lower surface of the guide rail and the support portion are contacted with each other, and therefore the amount of the abrupt change in an attitude of the disc tray can be reduced. And thereby the movement of the disc tray can be made smooth.

In a preferable embodiment of the present invention, the long pressing portion is formed such that the parallel part faces an upper surface of a rear end of the guide rail when a position of a gravity point, in the sliding direction, of the disc tray on which the optical disc medium is not placed is overlapped with the most front side support portion.

According to this structure, when the disc tray is moved, the upper surface of the rear end of the guide rail is guided by the inclination part and a lower surface of the rear end of the guide rail is moved closer to the support portion, irrespective of the placement or absence of the optical disc medium on the disc tray, and the size of the placed optical disc medium. As a result, abrupt change in the attitude of the tray can be suppressed irrespective of the size of the optical disc medium. Thus, the movement of the disc tray can be made smooth.

In a preferable embodiment of the present invention, the long pressing portion is formed such that the parallel part faces the upper surface of the rear end of the guide rail when a position of a gravity point, in the sliding direction, of the disc tray on which the optical disc medium which has the maximum diameter is placed is overlapped with the most front side support portion. A continuous part between the inclination part and the parallel part is formed in a curved surface.

The abrupt change in the attitude of the disc tray by its own weight can be made smaller irrespective of the placement or absence of the optical disc medium, and the size of the placed optical disc medium, and therefore the movement of the disc tray can be made smooth.

In a preferable embodiment of the present invention, a step portion is formed on each of both sides, in the sliding direction of the disc tray, of a bottom of the main chassis, and the support portions have a convex shape to protrude from upper surfaces of both the step portions.

In a preferable embodiment of the present invention, a side wall is provided for each of both sides, in the sliding direction of the disc tray, of the bottom of the main chassis, and the pressing portions are formed on side walls so as to protrude toward the inside of the main chassis.

DESCRIPTION OF THE PREFERRED EMBODIMENTS

Figure 1:
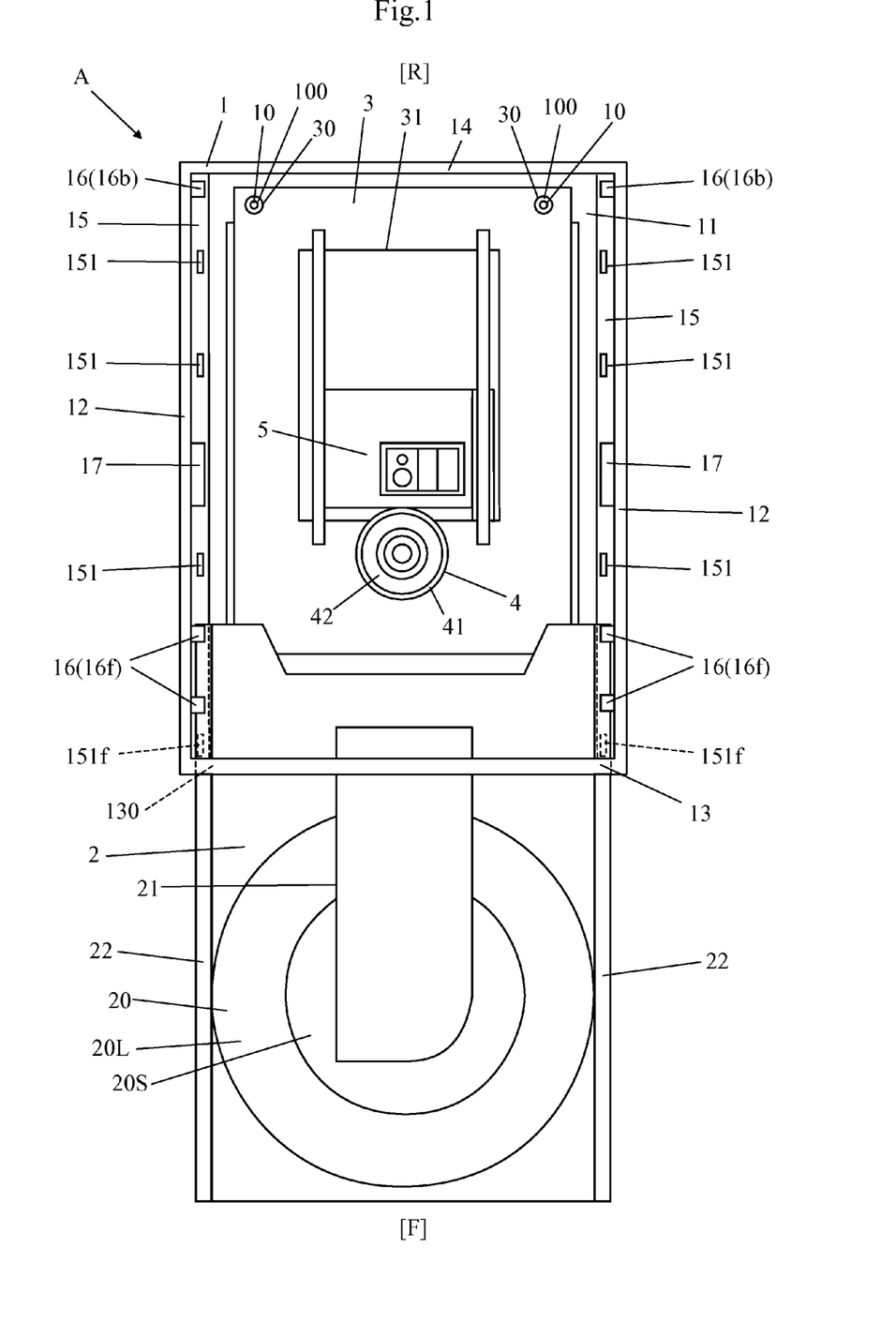
FIG. 1 is a plan view to show a state where a disc tray of an optical disc apparatus according to the present invention protrudes outside a main chassis from an opening.
Figure 2:
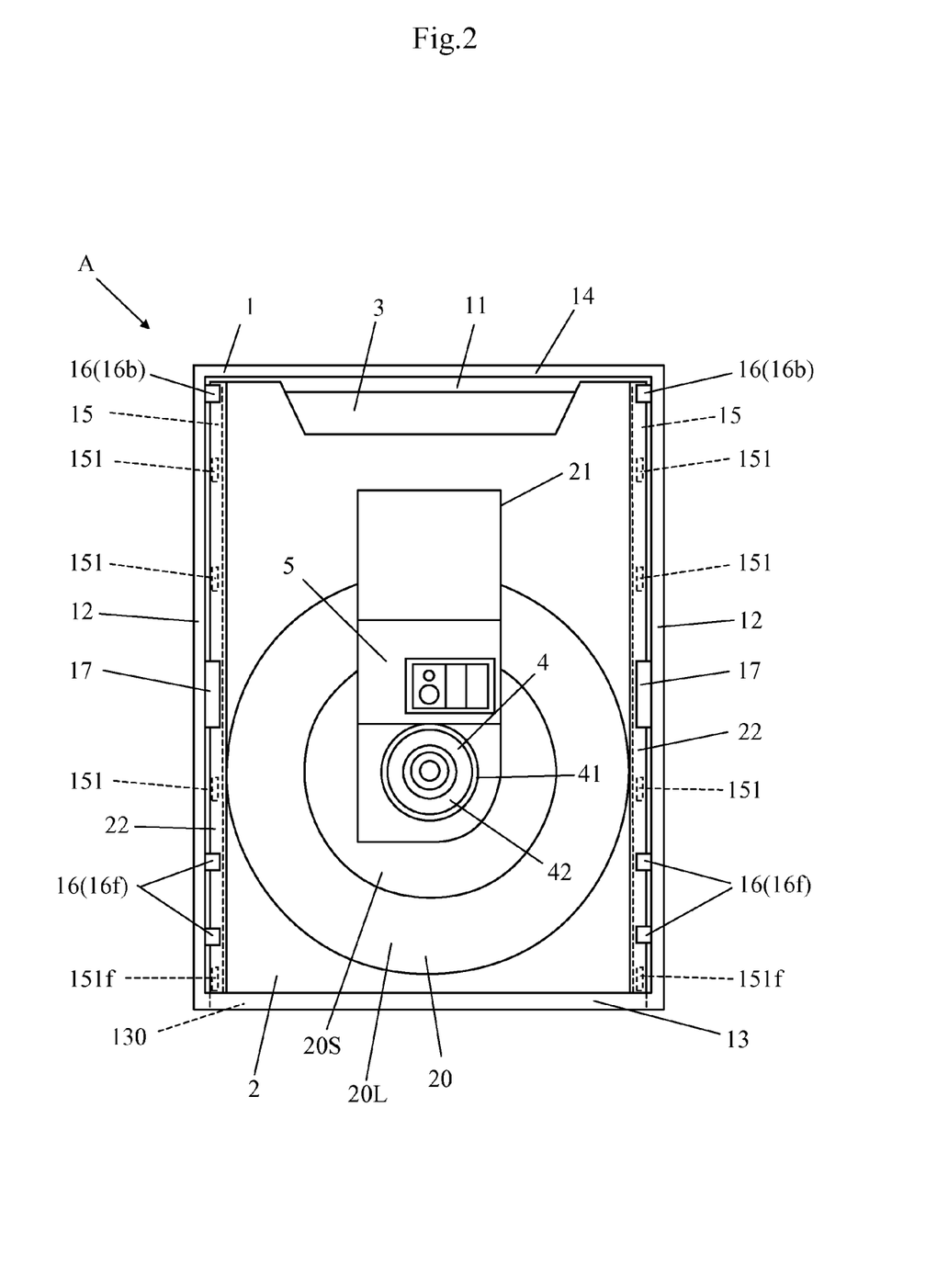
FIG. 2 is a plan view to show a state where the disc tray of the optical disc apparatus shown in FIG. 1 is placed in the inside of the main chassis.
Figure 3:
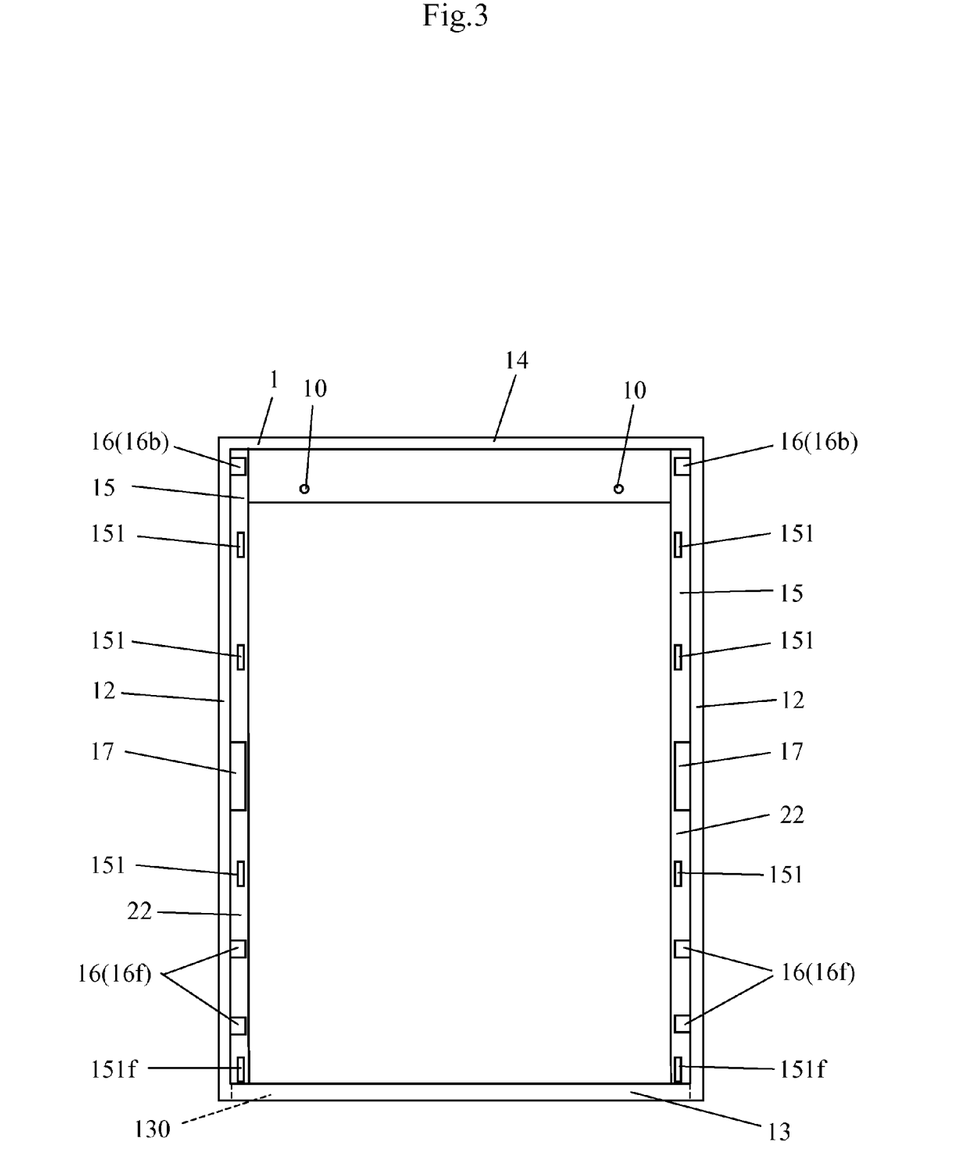
FIG. 3 is a plan view to show the main chassis.
Figure 4:
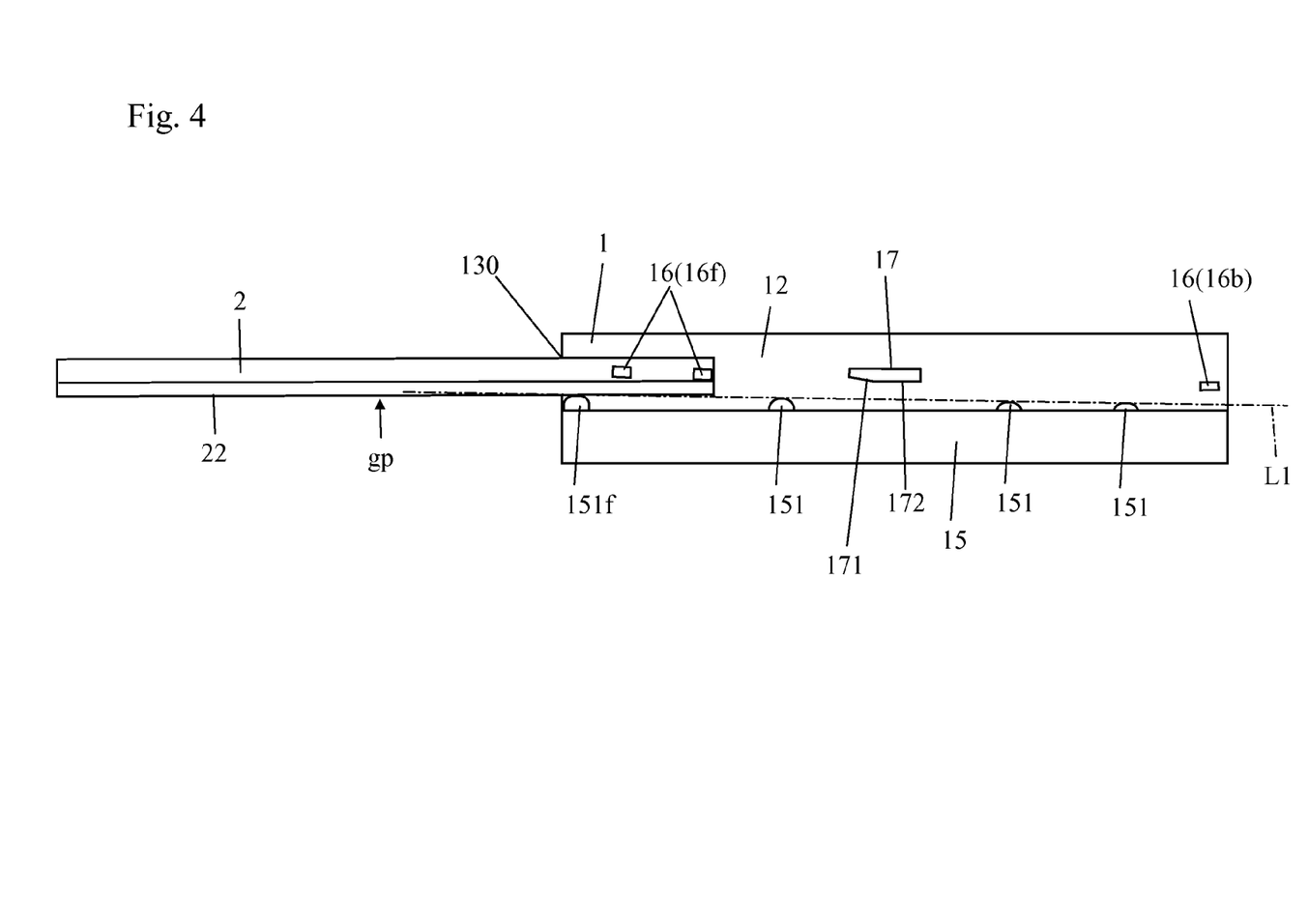
FIG. 4 is a diagram to show a position of the disc tray with respect to the main chassis when the disc tray protrudes most outside the main chassis.
Figure 5:
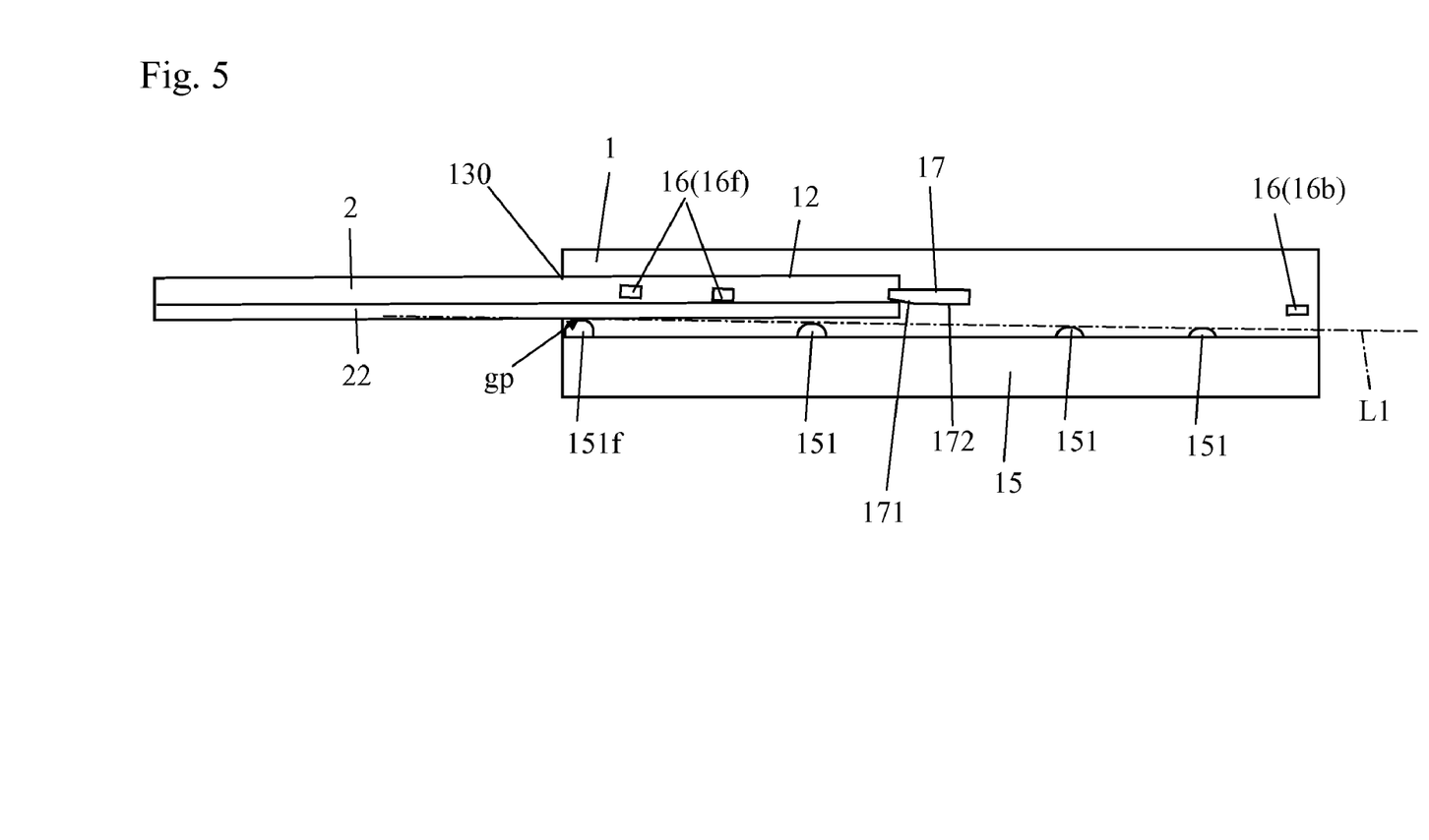
FIG. 5 is a diagram to show a position of the disc tray with respect to the main chassis when a front end of the disc tray protrudes outside the main chassis from the opening.
Figure 6:
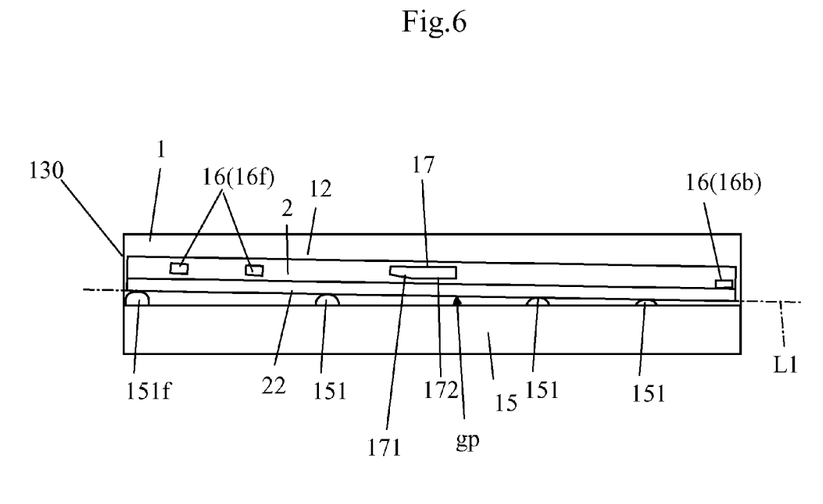
FIG. 6 is a diagram to show a position of the disc tray with respect to the main chassis when the disc tray is placed in the inside of the main chassis.

Hereinafter, an embodiment of the present invention will be explained with reference to drawings. FIG. 1 is a plan view to show a state where a disc tray of an optical disc apparatus according to the present invention protrudes outside a main chassis from an opening. FIG. 2 is a plan view to show a state where the disc tray of the optical disc apparatus shown in FIG. 1 is placed in the inside of the main chassis. FIG. 3 is a plan view to show the main chassis. FIG. 4 is a diagram to show a position of the disc tray with respect to the main chassis when the disc tray protrudes most outside. FIG. 5 is a diagram to show a position of the disc tray with respect to the main chassis when a front end of the disc tray protrudes outside the main chassis from the opening. FIG. 6 is a diagram to show a position of the disc tray with respect to the main chassis when the disc tray is placed in the inside of the main chassis. In drawings shown in FIG. 4 to FIG. 6, the optical disc medium is not placed on the disc tray.

As shown in FIG. 1 and FIG. 2, the optical disc apparatus includes a main chassis 1, a disc tray 2 arranged slidably in the main chassis 1 to carry an optical disc, and a traverse chassis 3 supported rotatably in the main chassis 1 and being rotated so as to move toward and away from (raised or lowered) the carried disc tray 2. Further, a disc driving portion 4 to hold and to drive the optical disc for rotation, and an optical pickup 5 to irradiate laser light for recording and reproducing of information onto the optical disc are attached to the traverse chassis 3.

In the explanation below, the protruding direction of the disc tray 2 is a front side (shown with letter F in FIG. 1), and the entering direction of the disc tray 2 is a rear side (shown with letter R in FIG. 1).

As shown in FIG. 1, the main chassis 1 is a box shaped body formed by resin having a bottom. The main chassis 1 has a rectangle shaped bottom 11, two side walls 12 standing up from both side ends of the bottom 11, a front wall 13 standing up from the front end of the bottom 11, a rear wall 14 standing up from a rear end of the bottom 11. Further, though it is not shown in drawings, a cover chassis is arranged at upper side of the main chassis 1. By attaching the cover chassis, the main chassis is closed.

An opening 130 is formed in the front wall 13 of the main chassis 1. The disc tray 2 can move in and out of the main chassis 1 through the opening 130. As shown in FIG. 1, the optical disc medium can be changed at a position where the disc tray 2 is moved to an outermost position. This position of the disc tray 2 is referred to as a disc changing position.

A step portion 15 is formed at each of the sides of the bottom 11 of the main chassis 1. The step portion 15 is formed across the whole length of a longer direction of the bottom 11, and it is formed integrally with the bottom 11 and the side walls 12. At the step portion 15, a plurality of support portions 151 are formed which protrude from upper surface thereof. Among the plurality of the support portions 151, a most front support portion 151f is the highest, and the rear support portion is lower than the front support portion. Therefore, when tips of the plurality of the support portions 151 are connected by a line, the line becomes straight line L1 (See, FIG. 4 and FIG. 5). When the disc tray 2 is moved to slide, a lower surface of a guide rail 22 (described later) is moved along this straight line L1.

At each side wall 12 of the main chassis 1, a plurality of short pressing portions 16 protruding from the inner surface, and a long pressing portion 17 which is longer than the short pressing portion 16 are formed. Two of the short pressing portions 16 are separately formed near the front end of the each of the left and right side walls 12, and one of the short pressing portion 16 is formed at the rear end of the each of the left and right side walls 12. The long pressing portion 17 is formed at each of the left and right side walls 12. The long pressing portion 17 is arranged between the front short pressing portions 16f and the rear short pressing portion 16b. The short pressing portions 16 and the long pressing portion 17 are located over the guide rail 22 when the guide rail 22 is placed over the support portion 151 (See, FIG. 2).

The disc tray 22 is formed as an integrally molded body of resin, and as shown in the drawings, the tray includes a disc placing depression on which the optical disc medium is placed. The disc placing depression has a large diameter portion 20L on which the optical disc medium with 12 cm diameter is placed, and a small diameter portion 20S which is formed inside the large diameter portion 20L and on which the optical disc medium with 8 cm diameter is placed.

Further, a through hole 21 is formed at central portion of the disc tray 2. When the traverse chassis 3 is rotated and moved closer to the disc tray 2, the disc driving portion 4 penetrates through the through hole 21. In addition, the disc tray 2 has guide rails 22 protruding sideways at both sides thereof. The guide rail 22 is formed continuously from the front end to the rear end along a longer direction of the side of the disc tray 2.

When the disc tray 2 is placed in the inside of the main chassis 1, a lower surface of the guide rail 22 of the disc tray 2 is supported by the support portions 151. As shown in FIG. 6, when the disc tray 2 is placed at the most inner part of the main chassis 1 (hereinafter referred to as a recording/reproducing position), the lower surface of the guide rail 22 is overlapped with the straight line L1, and the front side of the disc tray 2 is higher than the rear side of that. At this time, there is a space between an upper surface of the guide rail 22 and the front short pressing portions 16f and the long pressing portion 17. And the rear short pressing portion 16b is contacted with the upper surface of the guide rail 22.

When the disc tray 2 is placed at the recording/reproducing position, the rear short pressing portion 16b presses the upper surface of the guide rail 22. And thereby, the disc tray 2 is suppressed of floating. When the disc tray 2 is placed at the recording/reproducing position, the traverse chassis 3 is rotated (raised) toward the disc tray 2 side, and a turntable 42 is passed through the through hole 21 of the disc tray 2. At this time, the turntable 42 raises the optical disc medium which is placed on the disc placing depression, and the optical disc medium is held between the turntable 42 and a clamper (not shown) that is provided for the cover chassis.

The traverse chassis 3 is formed as an integrally molded body by resin. As shown in FIG. 1, the traverse chassis 3 has boss holes 30 on the rear side, and bosses 10 formed on the rear side of the main chassis 1 and have the outer diameter smaller than the inner diameter of the boss hole 30, penetrates the boss holes 30. Further, a floating rubber (dumper) 100 is arranged between the boss hole 30 and the boss 10. Because a space is formed between the boss 10 and the boss hole 30, the traverse chassis 3 is supported by the main chassis 1 so that the traverse chassis 3 is rotated (raised or lowered) with respect to the disc tray 2. The traverse chassis 3 is rotated by a cam slider which is not shown.

The disc driving portion 4 arranged in the traverse chassis 3 includes a motor 41 which is a power source and the turntable 42 which is fixed at output shaft of the motor 41 and supports the center of recording surface of the optical disc medium. Further, the optical pickup 5 includes an optical device (lens, light source and the like) for irradiating light onto the optical disc medium, and a driving portion. And the optical pickup 5 is arranged at an opening 31 formed in the traverse chassis 3 such that the pickup 5 can move along a radial direction of the optical disc medium.

In addition, the inside of the main chassis 1, a driving mechanism (not shown) is provided to drive the disc tray 2, the traverse chassis 3, and the optical pickup 5. The disc tray 2, traverse chassis 3 and optical pickup 5 may be driven by a common driving mechanism, or by two or more different driving mechanisms.

Hereinafter, movement of the disc tray 2 will be explained in detail with reference to the drawings. Both of front and rear ends of the disc tray 2 receive a force that pushes downwards the each ends respectively. This force is due to the weight of the disc tray 2 itself and the weight of the optical disc medium if the optical disc is placed. As shown in FIG. 1 and FIG. 4, when the disc tray 2 is placed at the disc changing position, a gravity point gp of the disc tray 2 is located front side than the opening 130. At this time, the force pushing down the front end is larger than the force pushing down the rear end.

As shown in FIG. 4, the front side of the disc tray 2 inclines downwards with the most front support portion 151f used as a fulcrum. At this time, the front short pressing portions 16f is in contact with an upper surface of the rear end of the guide rail 22. The inclination of disc tray 2 at the disc changing position is adjusted by height of the most front support portion 151f. In the optical disc apparatus according to the present invention, the height of the most front support portion 151f is adjusted so that the disc tray 2 becomes substantially horizontal (the position inclined with respect to the straight line L1).

The disc tray 2 which protrudes outside the main chassis 1 from the opening 130 is moved into the inside of that by the driving mechanism. When the disc tray 2 is moved into the inside of the main chassis 1, both of front and rear ends of the disc tray 2 receive force that push down the each ends respectively. The magnitude of the force acting on the both ends is changed by the position of the gravity point gp. For example, when the gravity point gp is the front side than the most front support portion 151f, the force pushing the front end of the disc tray 2 downwards is larger than the force pushing the rear end of that downwards. Further, when the gravity point gp is placed rear with respect to the most front support portion 151f, the force pushing the rear end of the disc tray 2 downwards is larger than the force pushing the front end of the disc tray 2 downwards.

That is, the forces acting on the both ends of the disc tray 2 and pushing the both ends downwards are balanced when the gravity point gp is at the most front support portion 151f. When the gravity point passes the balance position, the force having larger magnitude is changed between the forces acting on the both ends and pushing the both ends downwards. When the disc tray 2 is moved into the inside of the main chassis 1, the gravity point gp passes the most front support portion 151f, and thereby the rear end of the guide rail 22 is moved downwards, and the guide rail 22 is overlapped with the straight line L1. This change in an attitude (change of inclination) of the disc tray 2 happens immediately after the gravity point gp pass the most front support portion 151f.

In the optical disc apparatus A, to suppress the abrupt change in the attitude of the disc tray 2, the long pressing portion 17 is formed at the side wall 12. As shown in FIG. 4, the long pressing portion 17 includes an inclination part 171 which is formed on the front side and inclines downwards toward the rear side, and a parallel part 172 which is formed on the rear side of the inclination part 171 and substantially parallel with the straight line L1.

As shown in FIG. 5, the disc tray 2 is moved into the inside of the main chassis 1 so that the upper surface of the rear end of the guide rail 22 is in contact with the inclination part 171 of the long pressing portion 17. In FIG. 5, the gravity point gp of the disc tray 2 is the front side than the most front support portion 151. At this time, since the force pushing the front end of the disc tray 2 downwards is largest between the forces acting on the disc tray 2, the rear end is inclined upwards. The disc tray 2 is moved into the inside of the main chassis 1 in a state where the upper surface of the rear end of the guide rail 22 presses the inclination part 171 upwards. The upper surface of rear end of the guide rail 22 is pressed downwards by the inclination part 171. And thereby, the angle between the lower surface of the guide rail 22 and the straight line L1 is made smaller when the disc tray 2 moves into the inside of the main chassis 1.

Then, before the gravity point gp of the disc tray 2 reaches the most front support portion 151f, the upper part of the rear end of the guide rail 22 reaches a position so as to be in contact with the parallel part 172. While the upper part of the rear end of the guide rail 22 is in contact with the parallel part 172, a distance between the lower surface of the rear end of the guide rail 22 and the straight line L1 becomes short in comparison with a state where the upper surface of the rear end of that is in contact with the inclination part 171.

When the disc tray 2 is moved further inside, and the gravity point gp is moved rear over the most front support portion 151f, the force pushing the rear side downwards becomes larger than that pushing the front side downwards in the forces acting on the disk tray 2. And thereby, the disc tray 2 changes its attitude such that the lower part of the guide rail 22 is overlapped with the straight line L1 from the state where the upper part of the rear end of the guide rail 22 is in contact with the long pressing portion 17. As above described, because the angle of the disc tray 2 is changed in the state where the lower surface of the guide rail 22 is close to the straight line L1 by the long pressing portion 17, that is, in the state where the lower surface of the guide rail 22 is close to the support portion 151, amount of abrupt change of the disc tray 2 is made smaller, and therefore abrupt change in the attitude can be eased.

When the disc tray 2 is moved further inside, the traverse chassis 3 is started to be raised. When the traverse chassis 3 is started to be raised, the disc tray 2 is at the position where the disc driving portion 4 does not disturb movement of the disc tray 2. When the disc tray 2 is completely moved to the recording/reproducing position, an optical disc medium placed on the disc tray 2 is raised to the turntable 42.

When the disc tray 2 is oppositely moved from the recording/reproducing position to the outside disc changing position, the abrupt change of the attitude can be similarly eased. That is, even when the gravity point gp of the disc tray 2 reaches the front side than the most front support portion 151f, the upper part of the rear end of the guide rail 22 is pressed down by the parallel part 172 of the long pressing portion 17. Consequently, amount of abrupt change of the disc tray 2 on front side can be suppressed, and therefore the abrupt change in the attitude can be eased. When the disc tray 2 is moved further outside, the inclination of the disc tray 22 is changed gradually since the disc tray 22 is moved while the upper part of the rear end of the guide rail 22 is in contact with the inclination part 171.

Figure 7:
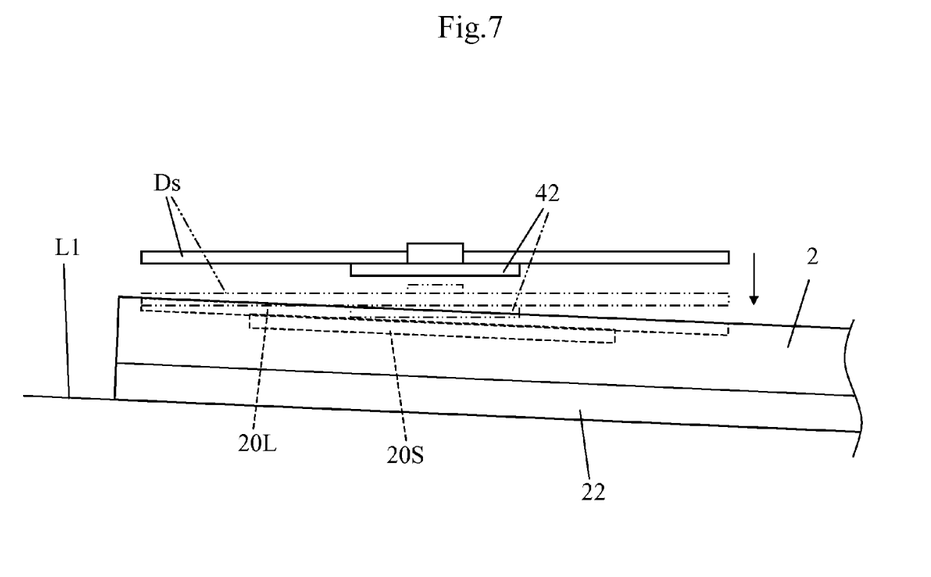
FIG. 7 is a diagram to show a relative position between the optical disc medium and a turntable when a traverse chassis is raised or lowered.

FIG. 7 is a diagram to show relative position between an optical disc medium and a turn table when a traverse chassis is raised or lowered. As shown in FIG. 7, because the disc tray 2 is inclined, the optical disc medium Ds which is held on the turntable 42 is in contact with not the all surface of the disc placing depression but from its end when the traverse chassis 3 is lowered, and therefore noise that is generated when they contact with each other can be suppressed.

In addition, the turntable 42 and the clamper are provided with a magnet and a yoke respectively, and the optical disc medium is held by a magnetic force generated between the magnets and the yokes. Because the optical disc medium is obliquely in contact with the disc placing depression, the magnets and the yokes can be disengaged by a small force when the optical disc medium is placed on the disc placing depression while being rotated. The strong contact between the optical disc medium Ds and the step portions by the reaction of the magnetic force is suppressed, and therefore the generation of noise at the contact time can be suppressed.

Figure 8:
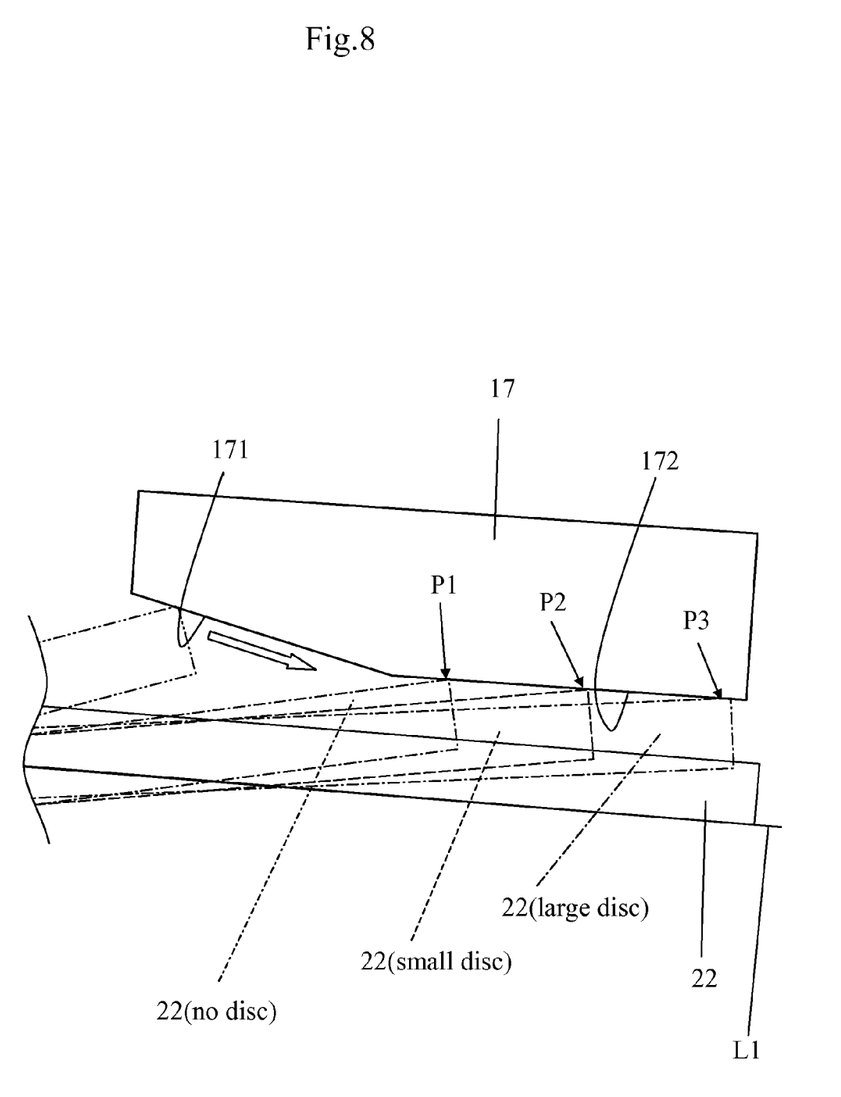
FIG. 8 is an enlarged diagram to show a long pressing portion of the optical disc apparatus according to the present invention.

Next, the detailed explanation about the long pressing portion will be given with reference to the drawings. FIG. 8 is an enlarged diagram to show the long pressing portion of the optical disc apparatus according to the present invention. For the convenience of the explanation, inclination angles of the long pressing portion 17 and the guide rail 22 are made larger than actual ones in an optical disc apparatus.

At first, the explanation about the gravity point of the disc tray 2 will be given for explaining about the long pressing portion 17. In the disc tray 2, positions of the gravity point are different among a case where no optical disc medium is placed on a disc placing depression (hereinafter referred to as "no disc"), a case where an optical disc medium with a small diameter (generally 8 cm) is placed (hereinafter referred to as "small disc"), and a case where an optical disc medium with a large diameter (generally 12 cm) is placed (hereinafter referred to as "large disc"). That is, a position of the disc tray 2 where a force pushing the front side of the disc tray 2 downwards and a force pushing the rear side thereof downwards are balanced is different depending on the presence or absence of the optical disc medium, and the size thereof. That is, a position where the rear end of the guide rail 22 starts to be contacted with the long pressing portion 17 is different.

The gravity point of the disc tray 2 is most rear side in case of the no disc, and is most front side in case of the large disc. As shown in FIG. 8, in case of the no disc, the upper part of the rear end of the guide rail 22 is contacted with (disengaged from) a most front point P1 of the parallel part 172. As a disc size is larger, the upper part is contacted with (disengaged from) a more rear point: a point P2 in case of the small disc, and a point P3 in case of the large disc.

As above described, the disc tray 2 is contacted with the parallel part 172 before or after the change of the attitude of the tray 2 irrespective of the presence or absence of a placed optical disc medium and the size thereof. Therefore, abrupt change of the attitude of the disc tray 2 due to movement of the gravity point can be suppressed. When the disc tray 2 is located at a position between the disc loading position and a position where the rear end of the guide rail 22 is contacted with the inclination part 171, the disc tray 2 passes the same trace irrespective of the presence or absence of a disc and the size thereof, because the lower surface and the upper surface of the tray are pressed by the most front support portion 151f and the front short pressing portions 16f.

The inclination part 171 and the parallel part 172 of the long pressing portion 17 are formed in a shape and at a position that satisfy the following conditions. First, the upper surface of the rear end of the guide rail 22 is in contact with the inclination part 171 when the gravity point of the disc tray 2 in case of no disc is outside the most front support portion 151*f*. The upper surface of the rear end of the guide rail 22 reaches the parallel part 172 when the gravity point of the disc tray 2 in case of no disc is more rear than the most front support portion 151*f*. The upper surface of the rear end of the guide rail 22 is in contact with a rear end of the parallel part 172, when the gravity point of the disc tray 2 on which a large disc is placed is overlapped with the most front support portion 151*f*.

Because the shape and the position of the long pressing portion 17 are decided as above described, the disc tray 2 can carry the optical disc medium without the abrupt and large change in the attitude while the tray is slid irrespective of the presence or absence of the optical disc medium and size thereof.

In the above described embodiment, the support portions protrude from the step portions, however, the present invention is not intended to be limited to this structure, but the support portions may protrude from the side walls toward the inside. The means which can stably support the lower surface of the guide rail of the disc tray are widely adopted. Though the pressing portions are formed on each of the left and right sides in the above described embodiment, the pressing portions may be formed on only one side. Furthermore, one side may include only the long pressing portion, or may include few or more short pressing portion.

Figure 9:
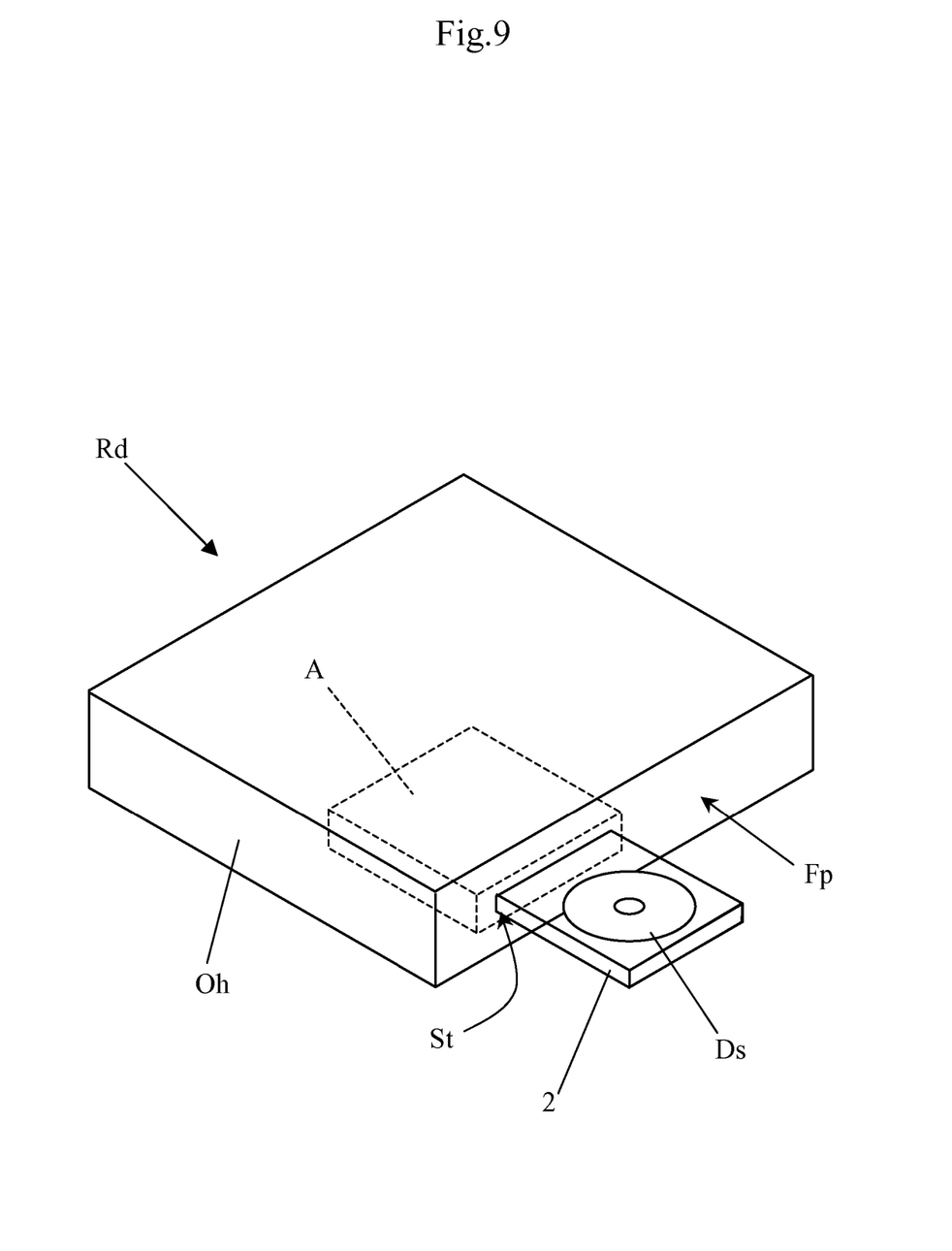
FIG. 9 is a perspective view to show a DVD recorder utilizing the optical disc apparatus according to the present invention.

FIG. 9 is a perspective view to show a DVD recorder utilizing the optical disc apparatus according to the present invention. As shown in FIG. 9, an optical disc apparatus A is provided in a chassis Oh of the DVD recorder Rd, and an optical disc Ds is placed on a disc tray 2 to load the disc inside of the optical disc apparatus A from an opening Op which is formed in a front panel Fp arranged on the front surface of the chassis Oh.

The present invention can be utilized in an electronic appliance in which the optical disc medium is used as a recording medium, for example, DVD player, DVD recorder and the like.

What is claimed is:

1. An optical disc apparatus, comprising:
    a disc tray configured to have an optical disc medium placed thereon;
    a main chassis formed in a box shape including an opened upper part, the main chassis including an opening in a front wall, the disc tray being configured to be moved in and out of the main chassis through the opening;
    a plurality of support portions formed on the main chassis to support lower surfaces of guide rails formed along sides of the disc tray; and
    a plurality of pressing portions formed on the main chassis to suppress floating of the guide rails,
    wherein the plurality of support portions is arranged such that the front side of the disc tray is inclined upwards with respect to the rear side of the disc tray when the disc tray is accommodated in the main chassis.

2. The optical disc apparatus according to claim 1, wherein:
    one of the pressing portions is a long pressing portion which is formed longer, in the sliding direction, than other pressing portion; and
    a lower surface of the long pressing portion includes:
        an inclination part which is formed on the front side of the lower surface and inclines downwards toward the rear side; and
        a parallel part formed to be connected with the rear side of the inclination part and to be parallel with a surface connecting upper parts of the support portions.

3. The optical disc apparatus according to claim 2, wherein a boundary between the inclination part and the parallel part is formed in a curved surface.

4. The optical disc apparatus according to claim 2, wherein the plurality of support portions is arranged such that the long pressing portion is held from opposing sides by the plurality of support portions in a sliding direction of the disc tray.

5. The optical disc apparatus according to claim 2, wherein the long pressing portion is formed such that the parallel part faces a rear end of the guide rail when a position of a gravity point, in the sliding direction, of the disc tray, configured such that the optical disc medium is not placed thereon, is overlapped with a support portion located closest to the opening among the plurality of support portions.

6. The optical disc apparatus according to claim 5, wherein the long pressing portion is formed such that the parallel part faces a rear end of the guide rail when a position of a gravity point, in the sliding direction, of the disc tray, configured such that the optical disc medium which has the maximum diameter is placed thereon, is overlapped with a support portion located closest to the opening among the plurality of support portions.

7. The optical disc apparatus according to claim 6, wherein a boundary between the inclination part and the parallel part is formed in a curved surface.

8. The optical disc apparatus according to claim 7, wherein:
    a step portion is formed on each of both sides, in the sliding direction of the disc tray, of a bottom of the main chassis; and
    the support portions comprise a convex shape to protrude from upper surfaces of both the step portions.

9. The optical disc apparatus according to claim 8, wherein:
    a side wall is provided for each of both sides, in the sliding direction of the disc tray, of a bottom of the main chassis; and
    the pressing portions protrude from the side walls toward the inside of the main chassis.

10. The optical disc apparatus according to claim 1, wherein:
    a step portion is formed on each of both sides, in the sliding direction of the disc tray, of a bottom of the main chassis; and
    the support portions comprise a convex shape to protrude from upper surfaces of both the step portions.

11. The optical disc apparatus according to claim 1, wherein:
    a side wall is provided for each of both sides, in the sliding direction of the disc tray, of a bottom of the main chassis; and
    the pressing portions protrude from the side walls toward the inside of the main chassis.

* * * * *